(12) United States Patent
Sorrentino et al.

(10) Patent No.: US 10,841,064 B2
(45) Date of Patent: Nov. 17, 2020

(54) METHODS FOR EFFICIENT SIGNALING IN V2X COMMUNICATIONS

(71) Applicant: Telefonaktiebolaget LM Ericsson (publ), Stockholm (SE)

(72) Inventors: Stefano Sorrentino, Solna (SE); Ricardo Blasco Serrano, Espoo (FI); Hieu Do, Järfälla (SE)

(73) Assignee: TELEFONAKTIEBOLAGET ERICSSON (publ), Stockholm (SE)

( * ) Notice: Subject to any disclaimer, the term of this patent is extended or adjusted under 35 U.S.C. 154(b) by 0 days.

(21) Appl. No.: 16/324,993

(22) PCT Filed: Aug. 11, 2017

(86) PCT No.: PCT/SE2017/050816
§ 371 (c)(1),
(2) Date: Feb. 12, 2019

(87) PCT Pub. No.: WO2018/038663
PCT Pub. Date: Mar. 1, 2018

(65) Prior Publication Data
US 2019/0190678 A1    Jun. 20, 2019

Related U.S. Application Data

(60) Provisional application No. 62/379,041, filed on Aug. 24, 2016.

(51) Int. Cl.
*H04L 5/00*   (2006.01)
*H04W 72/02*   (2009.01)
(Continued)

(52) U.S. Cl.
CPC .......... *H04L 5/0053* (2013.01); *H04L 5/0037* (2013.01); *H04L 5/0044* (2013.01);
(Continued)

(58) Field of Classification Search
None
See application file for complete search history.

(56) References Cited

U.S. PATENT DOCUMENTS

| | | | |
|---|---|---|---|
| 2010/0158147 A1* | 6/2010 | Zhang | H04W 52/242 375/260 |
| 2011/0110322 A1* | 5/2011 | Koyanagi | H04L 5/0092 370/329 |

(Continued)

FOREIGN PATENT DOCUMENTS

| | | |
|---|---|---|
| JP | 2010-536235 A | 11/2010 |
| KR | 2010/0062999 | 6/2010 |

(Continued)

OTHER PUBLICATIONS

International Search Report and Written Opinion of the International Searching Authority for International Application No. PCT/SE2017/050816 dated Nov. 8, 2017.

(Continued)

*Primary Examiner* — Ajit Patel
(74) *Attorney, Agent, or Firm* — Sage Patent Group

(57) ABSTRACT

A transmitting UE schedules radio frequency resources for use in a data transmission. The transmitting UE determines the transmission bandwidth, subject to certain restrictions, such as allowed DFT sizes for the UE for a data transmission. The determination may be performed through autonomous resource selection operations and/or may be performed using information received through signaling received from the network node as part of a scheduling grant. The UE further determines the ALLOCATED BANDWIDTH. The ALLOCATED BANDWIDTH can be determined based on the TRANSMISSION BANDWIDTH, which has been determined, using a defined rule. Furthermore, the UE generates and transmits toward a receiving UE a scheduling assignment (SA) that indicates the number or (Continued)

the set of subchannels that are within, and conform to, the ALLOCATED BANDWIDTH which was determined. The UE can then perform the data transmission using the SA indicated number or set of subchannels.

20 Claims, 5 Drawing Sheets

(51) Int. Cl.
*H04W 4/40* (2018.01)
*H04W 72/04* (2009.01)
*H04W 4/46* (2018.01)
*H04W 8/00* (2009.01)

(52) U.S. Cl.
CPC .......... *H04L 5/0064* (2013.01); *H04L 5/0094* (2013.01); *H04W 4/40* (2018.02); *H04W 4/46* (2018.02); *H04W 72/02* (2013.01); *H04W 72/0406* (2013.01); *H04W 72/0453* (2013.01); *H04L 5/0007* (2013.01); *H04W 8/005* (2013.01)

(56) References Cited

U.S. PATENT DOCUMENTS

| | | | |
|---|---|---|---|
| 2011/0134874 A1* | 6/2011 | Nakao | H04L 1/1822 370/329 |
| 2011/0223953 A1* | 9/2011 | Lee | H04W 76/14 455/509 |
| 2015/0092710 A1 | 4/2015 | Novlan et al. | |
| 2016/0057736 A1* | 2/2016 | Jung | H04W 74/06 370/329 |
| 2017/0013481 A1* | 1/2017 | Wang | H04W 72/0473 |
| 2017/0019813 A1* | 1/2017 | Kim | H04L 5/0044 |
| 2017/0064704 A1* | 3/2017 | Seo | H04W 72/0446 |
| 2017/0201359 A1* | 7/2017 | Li | H04W 72/0453 |
| 2017/0245313 A1* | 8/2017 | Kim | H04L 5/0092 |
| 2018/0152269 A1* | 5/2018 | Xiong | H04L 5/0053 |
| 2018/0167882 A1* | 6/2018 | Choi | H04W 74/008 |
| 2018/0199341 A1* | 7/2018 | Baldemair | H04L 27/264 |
| 2018/0234188 A1* | 8/2018 | Hisano | H04B 10/2575 |
| 2018/0255586 A1* | 9/2018 | Einhaus | H04L 5/0082 |
| 2020/0059917 A1* | 2/2020 | Feng | H04W 72/048 |

FOREIGN PATENT DOCUMENTS

| | | |
|---|---|---|
| WO | 2009020422 A2 | 2/2009 |
| WO | WO 2015/021185 A1 | 2/2015 |
| WO | WO 2015/171048 A1 | 11/2015 |
| WO | WO 2016/048444 A1 | 3/2016 |

OTHER PUBLICATIONS

Notice of Reasons for Rejection for Japanese Patent Application No. 2019-510968 dated Mar. 24, 2020, including English translation, 8 pages.
Summary of the Notice of Preliminary Rejection for Korean Patent Application No. 20197006786 dated Jul. 7, 2020, 3 pages.
Notice of Preliminary Rejection for Korean Patent Application No. 2019-7006786, Chinese language document, 5 pages.

* cited by examiner

METHODS FOR EFFICIENT SIGNALING IN V2X COMMUNICATIONS

CROSS REFERENCE TO RELATED APPLICATIONS

This application is a 35 U.S.C. § 371 national stage application of PCT International Application No. PCT/SE2017/050816, filed on Aug. 11, 2017, which claims the benefit of U.S. Provisional Patent Application Ser. No. 62/379,041, filed on Aug. 24, 2016, the disclosures and content of which are incorporated by reference herein in their entireties.

TECHNICAL FIELD

The present disclosure relates to methods and operations by network nodes and user equipments for resource management for wireless communications between user equipments.

BACKGROUND

During Release 12, the LTE standard has been extended with support of device to device (D2D) (specified as "sidelink") features targeting both commercial and Public Safety applications. Some applications enabled by Rel-12 LTE are device discovery, where devices may sense the proximity of another device and associated application by broadcasting and detecting discovery messages that carry device and application identities. Another application consists of direct communication based on physical channels terminated directly between devices.

D2D communications may be extended to support Vehicle-to-X (V2X) communications, which includes any combination of direct communication between vehicles, pedestrian carried devices, and infrastructure mounted devices. V2X communication may take advantage of available network (NW) infrastructure, although at least basic V2X connectivity can be possible in case of lack of available network infrastructure. Providing an LTE-based V2X interface may be economically advantageous because of the LTE economies of scale and it may enable tighter integration between communications with the NW infrastructure (vehicle-to-infrastructure (V2I)), vehicle-to-pedestrian (V2P), and vehicle-to-vehicle (V2V) communications, as compared to using a dedicated V2X technology.

V2X communications may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. Devices check availability of a CAM message every 100 ms, yielding a maximum detection latency requirement is not more than 100 ms for most CAM messages. However, the latency requirement for Pre-crash sensing warning is not more than 50 ms.

A DENM message is event-triggered, such as by braking, and the availability of a DENM message is also checked for every 100 ms, and the requirement of maximum latency is not more than 100 ms.

The package size of CAM and DENM message can vary from more than 100 to more than 800 bytes, although the typical size is around 300 bytes depending on the specific V2X use case, message type (e.g. DENM can be larger than CAM), and depending on the security format included in the packet (e.g., full certificate or certificate digest). The message is supposed to be detected by all vehicles in proximity.

The Society of the Automotive Engineers (SAE) has defined a Basic Safety Message (BSM) for DSRC with various defined messages sizes. Based on the importance and urgency of the messages, the BSMs are further classified into different priorities. In V2X, the system bandwidth is divided into subchannels. Each subchannel consists of several resource blocks (RBs). Different subchannels contain disjoint sets of RBs. The UE is allocated an integer number of subchannels for transmission. Within this allocation, the UE transmits both control information (i.e., a scheduling assignment) and data, which forms the allocated bandwidth.

In LTE (in general, and in particular in V2X), the transmission bandwidth used by a UE is limited by allowed Discrete Fourier Transform (DFT) sizes, i.e., DFT sizes that the UE is allowed to use for transmission/reception. Allowed DFT sizes in LTE are products of powers of 2, 3, 5 in order to enable optimized DFT implementations for SC-OFDM transmission. This forms the transmission bandwidth.

Usually, the number of available RBs allocated to a UE for transmission (i.e., the number of RBs contained in an integer number of subchannels) does not correspond to an allowed DFT size. This problem is made worse by the fact that within its allocation, the UE may need to divide its RBs for transmission of control information and data. In addition, the overhead in signaling the data allocation from an SA is challenging and should be kept as compact as possible.

SUMMARY

It is an object in this disclosure to basically address the problems outlined above. These objects and others may be obtained by providing the methods and user equipment (UE) according to the embodiments attached below.

According to a first aspect, there is a method by a transmitting user equipment (UE) for controlling radio resources used for a data transmission. The method includes determining transmission bandwidth for the data transmission. Further the method includes determining an allocated bandwidth, and finally the method includes transmitting toward a receiving UE a scheduling assignment that indicates a number or a set of subchannels within the allocated bandwidth.

According to a second aspect, there is a UE for controlling radio resources used for a data transmission, the UE includes a radio transceiver at least one processor, at least one memory coupled to the at least one processor and the radio transceiver, and storing program code that when executed by the at least one processor causes the at least one processor to perform operations including determining transmission bandwidth for the data transmission, determining an allocated bandwidth; and transmitting toward a receiving UE a scheduling assignment that indicates a number or a set of subchannels within the allocated bandwidth.

According to a third aspect, there is a method by a receiving user equipment (UE) for receiving a data transmission using radio resources. The method includes determining allocated bandwidth for a data transmission based on control signaling that is received by the receiving UE. The method further includes determining (transmission bandwidth associated with the allocated bandwidth based on a rule that is used by a transmitting UE, which will perform the data transmission, to determine the allocated bandwidth based on the transmission bandwidth, and finally the method includes decoding a signal based on the parameters of the transmission bandwidth.

According to a fourth aspect, there is a UE for receiving a data transmission using radio resources, the UE includes a radio transceiver, at least one processor, at least one memory coupled to the at least one processor and the radio transceiver, and storing program code that when executed by the at least one processor causes the at least one processor to perform operations including determining allocated bandwidth for a data transmission based on control signaling that is received by the receiving UE, determining transmission bandwidth associated with the allocated bandwidth based on a rule that is used by a transmitting UE, which will perform the data transmission, to determine the allocated bandwidth based on the transmission bandwidth, and decoding a signal from the data transmission based on parameters of the transmission bandwidth.

An advantage that may be achieved when using above embodiments in that the disclosed signaling of the number or subset of scheduling assignments and/or data subchannels requires less signaling than directly signaling the scheduled resources. The scheduled bandwidth is thereby implicitly determined based on the limitations due e.g. to DFT size, as a function of the indicated subchannels. Radio resources of the communication system are thereby conserved for other uses by these or other UEs, and the UEs may have improved operational efficiency by benefiting from knowledge of the scheduled bandwidth.

According to other aspects methods described above may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Various embodiments of the present disclosure are directed to controlling resource allocation using rules for reducing signaling overhead to schedule data transmission whose transmission bandwidth does not equal the bandwidth of subchannels defined for communication. Operations and methods are provided to determine rules which control the determination and communication of a mapping between the transmission bandwidth and allocated bandwidth, so as to reducing signaling overhead in V2X communications between devices.

Figure 1:
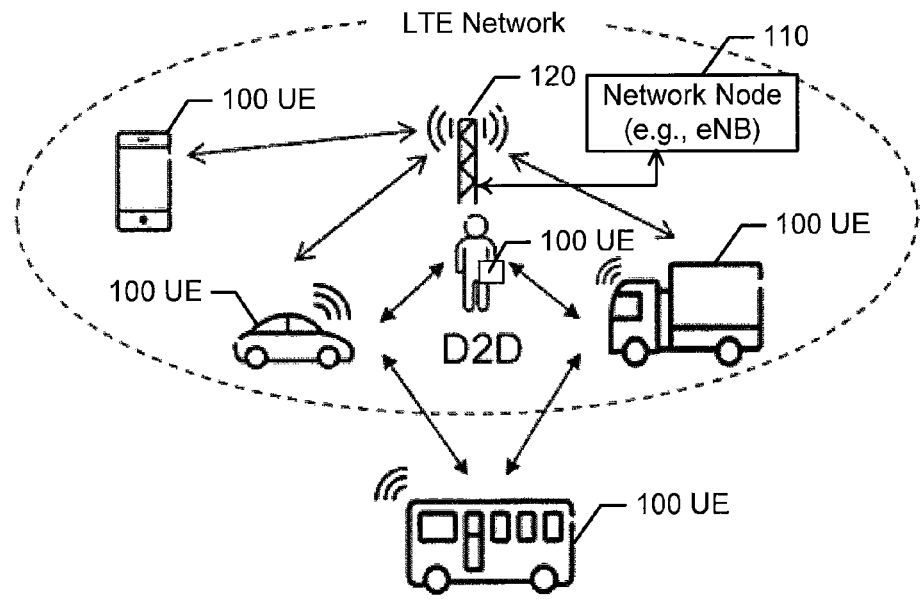
FIG. 1 illustrates a block diagram of a communication system that includes UEs configured for V2X or D2D communication of data using radio resources in accordance with various embodiments of the present disclosure.

Various embodiments of the present disclosure are described without limitation in the context of a communication system shown in the block diagram of FIG. 1. The communication system includes UEs that are configured for D2D, V2X, and/or other sidelink communication of packets in accordance with various embodiments of the present disclosure. The communication system can include a radio node 120, a network node 110 (e.g., an eNB), and a plurality of UEs 100. The UEs 100 can be any type of electronic device or wireless communication device configured for D2D and/or V2X communications such as any one or more of: vehicle-to-infrastructure (V2I) communications; vehicle-to-pedestrian (V2P) communications; and vehicle-to-vehicle (V2V) communications. As used herein, D2D is referred to in a broader sense to include communications between any type of UEs, and includes V2X communications between a vehicle and any other type of UE. D2D and/or V2X is or will be a component of many existing wireless technologies when it comes to direct communication between wireless devices. D2D and/or V2X communications as an underlay to cellular networks have been proposed as a means to take advantage of the proximity of communicating devices and at the same time to allow devices to operate in a controlled interference environment. Typically, it is suggested that such D2D and/or V2X communication may share the same spectrum as the cellular system, for example by reserving some of the cellular uplink resources for D2D and/or V2X purposes. Allocating dedicated spectrum for D2D and/or V2X purposes is another alternative. For D2D and/or V2X communication to occur, the involved wireless device may need the same understanding of uplink subframe timing as the cellular network as they otherwise might overlap in time with cellular transmissions. D2D and/or V2X should support operations for UEs which are out of coverage from the network. Example types of a UE 100 include, but not limited to, a personal data assistant (PDA), tablet computer (e.g., iPAD), mobile terminal, smart phone, smart watch, laptop embedded equipped (LEE), laptop mounted equipment (LME), vehicle mounted communication device, infrastructure mounted communication device, etc.

Although various embodiments are explained in the context of V2X communications, these embodiments can also be used for x2V communications. Accordingly, each use of the term "V2X" herein can be replaced with the term "x2V" for disclosure all of those corresponding embodiments. Similarly, these embodiments can be used for other types of device to device communications, including D2D and other sidelink communications. Accordingly, each use of the term "V2X" herein can be replaced with the term "D2D" for disclosure all of those corresponding embodiments. Moreover, although some embodiments are described in the context of LTE evolution, they may be used in other wireless systems, including systems that operate according to 5G standards, also referred to as new radio (NR), or future radio technologies and standards.

The 3GPP has issued agreements concerning NR terminology in the period between the earliest priority date and the filing date of the present disclosure. NR terminology and LTE terminology coincide to a considerable extent; for instance, a resource element (RE) remains 1 subcarrier×1 OFDM symbol. Yet some terms known in LTE have been given a new meaning in NR. This disclosure, including the claims, applies prefixes "LTE" and "NR" when indefiniteness could otherwise arise.

A non-prefixed term in this disclosure is to be understood in the LTE sense unless otherwise stated. However, any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible.

Therefore, even though some embodiments of this disclosure have been described using LTE-originated terminology, they remain fully applicable to NR technology.

Various embodiments of the present disclosure are directed to methods and operations for where a UE 100 sends a scheduling assignment (SA) in one fraction of the system bandwidth (BW), e.g., referred to as a "SA subchannel," and schedules a data transmission that will span some defined frequency resources, either in the same subframe or in another subframe.

Figure 4:
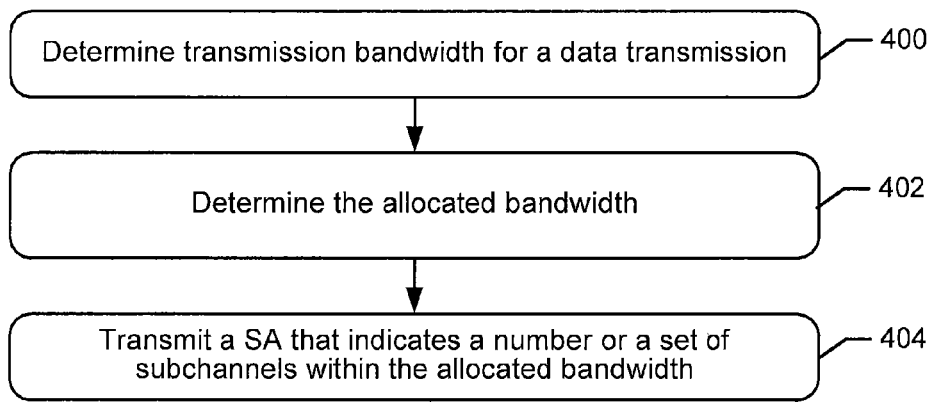
FIGS. 4 and 5 are flowcharts of operations and methods that are performed by a transmitting UE configured according to some embodiments.

Transmitting UE Operations:

Various operations that can be performed by a transmitting UE 100 (Tx) to schedule radio frequency resources for use in a data transmission are explained below. FIG. 4 is a flowchart of operations and methods performed by a transmitting UE 100 (Tx) according to some embodiments. Referring to FIG. 4, the transmitting UE 100 (Tx) determines (block 400) the TRANSMISSION BANDWIDTH (which is subject to restrictions, such as allowed (e.g., supported) DFT sizes for the UE 100 (Tx)) for a data transmission). The determination (block 400) may be performed through autonomous resource selection operations and/or may be performed using information received through signaling received from the network node 110 as part of a scheduling grant.

Figure 2:
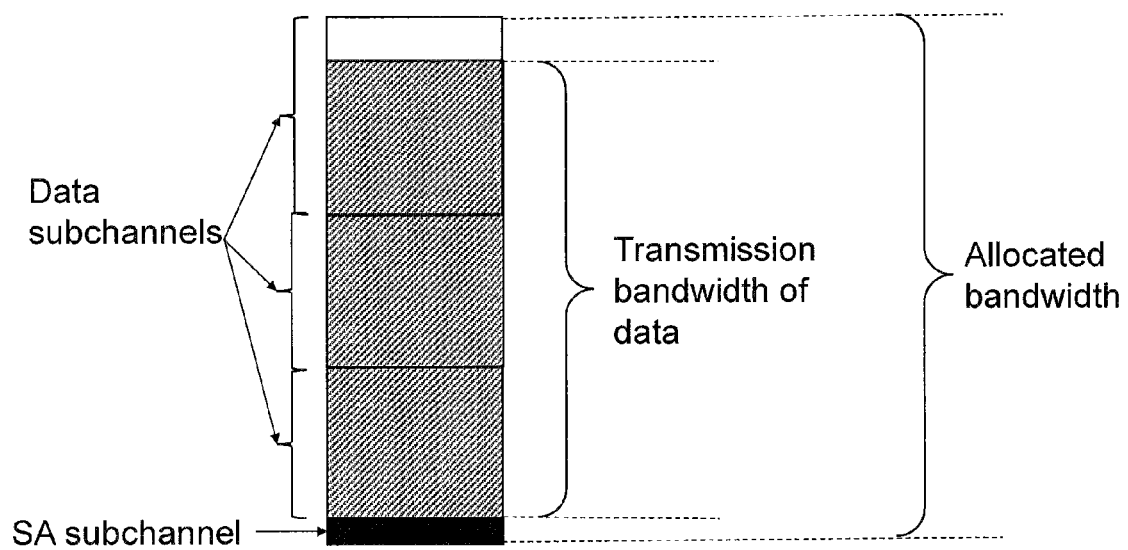
FIG. 2 illustrates a graph of radio frequency resource bandwidth used by a UE to transmit data within a larger range of allocated radio frequency resource bandwidth, and shows data subchannels and a scheduling assignment (SA) subchannel that is scheduled by the UE in accordance with some embodiments.
Figure 3:
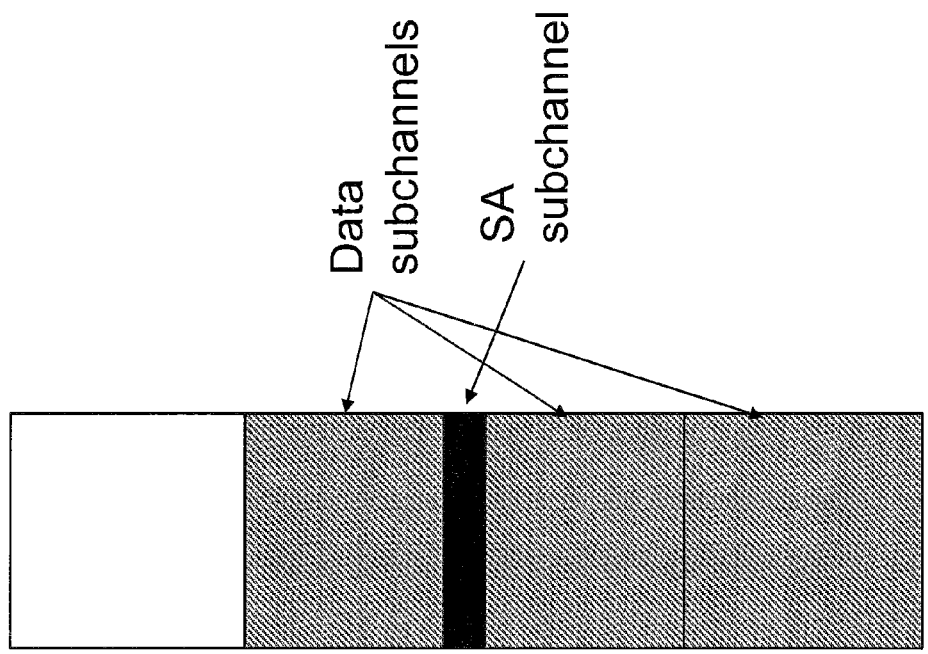
FIG. 3 illustrates two graphs, each showing alternative embodiments of operations by a UE.
Figure 3:
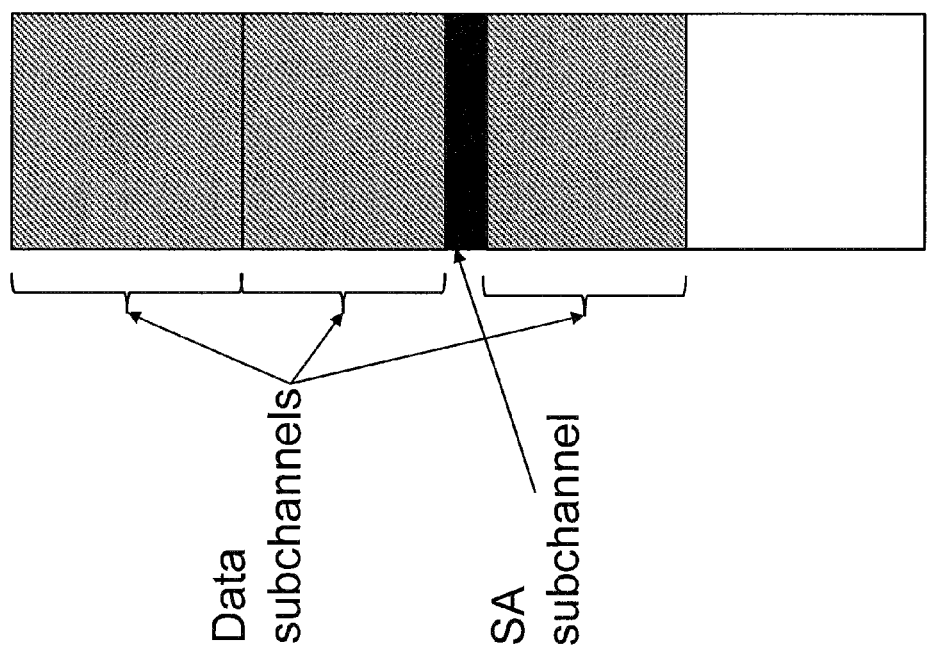

FIG. 2 illustrates a graph of radio frequency resource bandwidth for transmitting data within a larger range of allocated bandwidth of radio frequency resources, and shows data subchannels and a scheduling assignment (SA) subchannel that is scheduled by a UE 100 using a SA, in accordance with some embodiments. FIG. 3 illustrates two graphs, each showing alternative embodiments of operations by a UE 100 for using a SA to reserve a SA subchannel, for a data transmission, that is located between adjacent data subchannels, in accordance with some embodiments. The embodiment could also be explained as embodiments of operations by a UE 100 for using an SA subchannel to transmit control information that schedules a data transmission, and the SA subchannel is located in between the data subchannels.

The UE 100 (Tx) determines (block 402) the ALLOCATED BANDWIDTH. The ALLOCATED BANDWIDTH can be determined based on the TRANSMISSION BANDWIDTH, which has been determined (block 400), using a defined rule. In one embodiment, the defined rule determines the ALLOCATED BANDWIDTH to correspond to the smallest number of subchannels in the TRANSMISSION BANDWIDTH, so that the ALLOCATED BANDWIDTH is greater than or equal to the TRANSMISSION BANDWIDTH. For example, as shown in FIG. 2, the ALLOCATED BANDWIDTH includes, but is greater than, the TRANSMISSION BANDWIDTH.

The UE 100 (Tx) generates and transmits (block 404) toward a receiving UE a SA that indicates the number or the set of subchannels that are within, and conform to, the ALLOCATED BANDWIDTH which was determined (block 402). The UE 100 (Tx) can then perform the data transmission using the SA indicated number or set of subchannels.

Although the phrases "TRANSMISSION BANDWIDTH" and "ALLOCATED BANDWIDTH" are in some paragraphs shown in all upper case letters for ease of reference and in other paragraphs shown in lower case letters, it is to be understood that the upper or lower case lettering does not change the meaning or consistency of reference by each of those phrases and does not convey a different interpretation of these phrases beyond their ordinary and customary meaning in view of the present disclosure. Thus, e.g., "TRANSMISSION BANDWIDTH" is used interchangeably with "transmission bandwidth" for convenience.

In some alternative embodiments, the operations shown in FIG. 4 for determining (block 400) TRANSMISSION BANDWIDTH and the operations for determining the ALLOCATED BANDWIDTH by the UE 100 (Tx) are performed in the opposite order to that shown. That is, the UE 100 (Tx) may first determine the ALLOCATED BANDWIDTH and then determine the TRANSMISSION BANDWIDTH. In these alternative embodiments, the example of the rule above would become: the TRANSMISSION BANDWIDTH is determined as the largest number of RBs for an allowed DFT size for the UE 100 (Tx) and such that the ALLOCATED BANDWIDTH is greater or equal to the TRANSMISSION BANDWIDTH. For example, the network node 110, e.g., an eNB, may signal the ALLOCATED BANDWIDTH to the UE 100 (Tx) which the UE 100 (Tx) uses to determine the TRANSMISSION BANDWIDTH.

Figure 5:
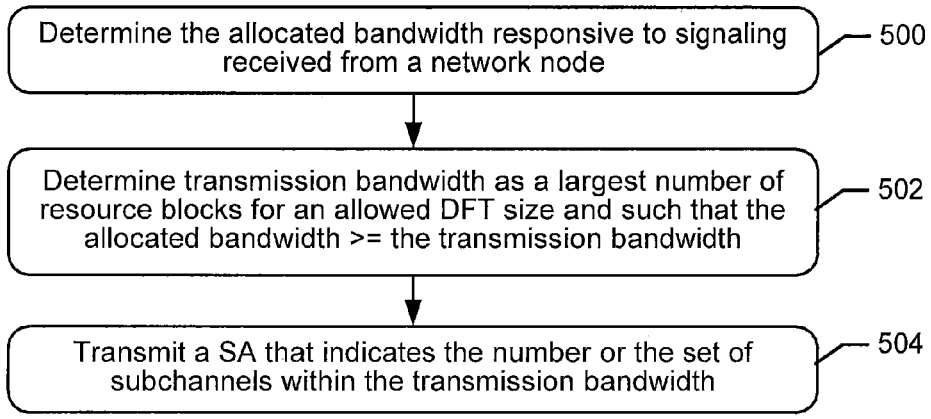

FIG. 5 is a flowchart of these alternative reverse order of operations and methods for determining the TRANSMISSION BANDWIDTH and the ALLOCATED BANDWIDTH, i.e., blocks 400 and 402, performed by the transmitting UE 100 according to some embodiments. Referring to FIG. 5, the UE 100 (Tx) determines (block 500) the ALLOCATED BANDWIDTH responsive to signals received from the network node 110. The UE 100 (Tx) then determines (block 502) the TRANSMISSION BANDWIDTH as the largest number of RBs for an allowed DFT size and such that the ALLOCATED BANDWIDTH is greater or equal to the TRANSMISSION BANDWIDTH. The UE 100 (Tx) then generates and transmits (block 504) a SA that indicates the number or the set of subchannels that are within, and conform to, the ALLOCATED BANDWIDTH which was determined (block 402).

In some embodiments where the SA subchannel is placed between data subchannels in different ways (such as shown in the right-side graph in FIG. 3), the UE 100 (Tx) determines where to place the SA subchannel according to a predefined rule, which in one embodiment places the data subchannel to start from the lower frequency.

Figure 6:
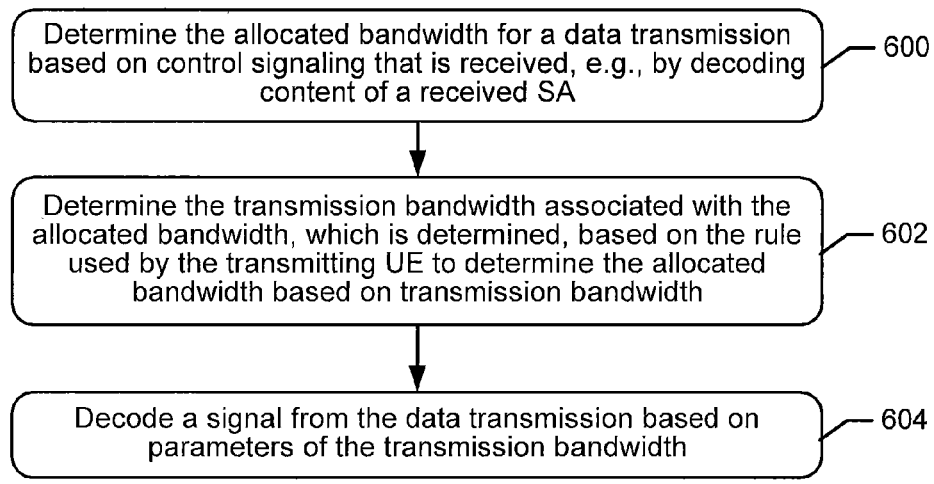
FIG. 6 is a flowchart of operations and methods that are performed by a receiving UE configured according to some embodiments.

Receiving UE Operations:

Corresponding operations and methods that can be performed by a receiving UE 100 (Rx) are explained below with regard to the flowchart of FIG. 6, in accordance with some embodiments. Referring to FIG. 6, the receiving UE 100 (Rx) determines (block 600) the ALLOCATED BANDWIDTH for a data transmission based on control signaling that is received. In one embodiment, the receiving UE 100 receives the control signaling by decoding content of a SA that is received from the transmitting UE (Tx) and which indicates a number or a set of subchannels within the allocated bandwidth.

The receiving UE 100 (Rx) determines (block 602) the TRANSMISSION BANDWIDTH associated with the ALLOCATED BANDWIDTH, which is determined (block 600), based on the rule that is used by the transmitting UE 100 (Tx), which will perform the data transmission, to determine the ALLOCATED BANDWIDTH based on the TRANSMISSION BANDWIDTH. In a further embodiment, the receiving UE 100 (Rx) determines the TRANSMISSION BANDWIDTH to correspond to the largest number of RBs for an allowed DFT size and such that the ALLOCATED BANDWIDTH is greater or equal to the TRANSMISSION BANDWIDTH.

The receiving UE 100 (Rx) then decodes (block 604) a signal from a data transmission based on the parameters of the scheduled bandwidth, e.g., transmission bandwidth. In other words, the receiving UE 100 (Rx) uses the determined transmission bandwidth to constrain what radio frequency resources are searched for the signal that is to be decoded.

Potential Advantages of Various Embodiments

Operations and methods disclosed herein may provide an advantage in that the disclosed signaling of the number or subset of SA and/or data subchannels requires less signaling than directly signaling the scheduled resources. The scheduled bandwidth is thereby implicitly determined based on the limitations due e.g. to DFT size, as a function of the indicated subchannels. Radio resources of the communication system are thereby conserved for other uses by these or other UEs, and the UEs may have improved operational efficiency by benefiting from knowledge of the scheduled bandwidth.

Example User Equipment

Figure 7:
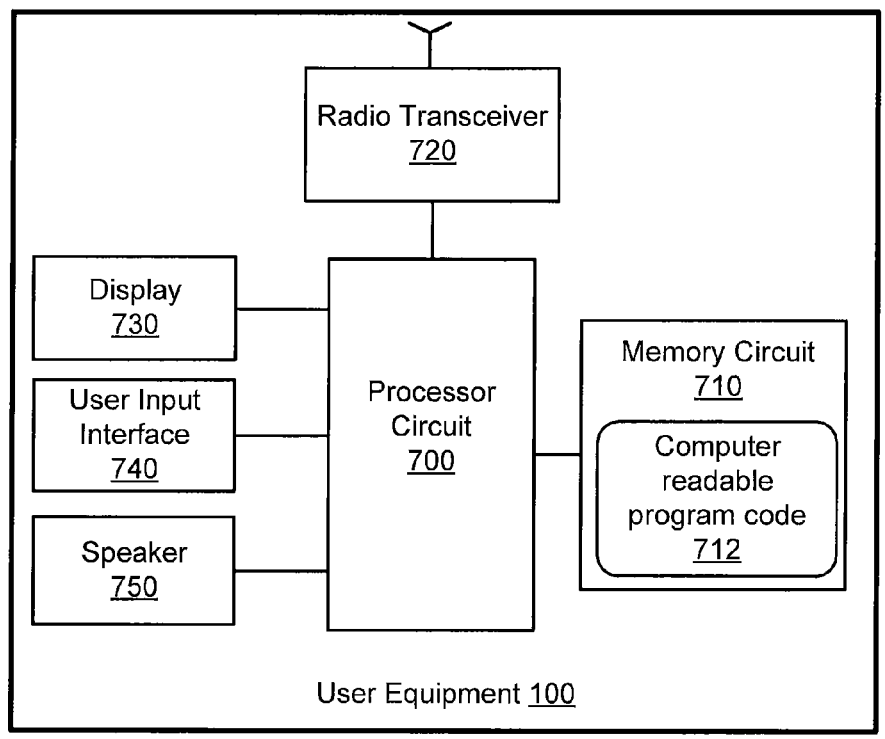
FIG. 7 is a block diagram of a UE configured according to some embodiments of the present disclosure.

FIG. 7 is a block diagram of a UE 100, for use in a telecommunications system, that is configured to perform operations according to one or more embodiments disclosed herein. The UE 100 includes a radio transceiver circuit 720, a processor circuit 700, and a memory circuit 710 containing computer readable program code 712. The UE 100 may further include a display 730, a user input interface 740, and a speaker 750.

The transceiver 720 is configured to communicate with other UEs, which as explained in FIG. 1 may correspond to infrastructure mounted devices, vehicle mounted/carried devices, pedestrian carried devices, etc. and the network node 110, through a wireless air interface using one or more of the radio access technologies. The processor circuit 700 may include one or more data processing circuits, such as a general purpose and/or special purpose processor, e.g., microprocessor and/or digital signal processor. The processor circuit 700 is configured to execute the computer readable program code 712 in the memory circuit 710 to perform at least some of the operations described herein as being performed by a UE 100. When the UE is a transmitting UE adapted for controlling radio resources used for a data transmission, the operations may include to determine the TRANSMISSION BANDWIDTH for the data transmission. Further the operations may include the UE to determine an ALLOCATED BANDWIDTH and to transmit toward a receiving UE a scheduling assignment that indicates a number or a set of subchannels within the allocated bandwidth. The operation the UE determines the TRANSMISSION BANDWIDTH may include determining the TRANSMISSION BANDWIDTH based on allowed Discrete Fourier Transform size. The operation that the UE determines the ALLOCATED BANDWIDTH may include to determine the ALLOCATED BANDWIDTH based on the transmission bandwidth using a defined rule. Determining the ALLOCATED BANDWIDTH based on the TRANSMISSION BANDWIDTH using a defined rule may include determine the allocated bandwidth to correspond to a smallest number of subchannels in the TRANSMISSION BANDWIDTH, so that the ALLOCATED BANDWIDTH is greater than or equal to the TRANSMISSION BANDWIDTH. When the UE is a receiving UE adapted for receiving a data transmission using radio resources, the operations may include the UE to determine the ALLOCATED BANDWIDTH for a data transmission based on control signaling that is received by the receiving UE. The operations may further include the UE to determine the TRANSMISSION BANDWIDTH associated with the ALLOCATED BANDWIDTH based on a rule that is used by a transmitting UE, which will perform the data transmission, to determine the ALLOCATED BANDWIDTH based on the TRANSMISSION BANDWIDTH and to decode a signal from the data transmission based on parameters of the TRANSMISSION BANDWIDTH. The ALLOCATED BANDWIDTH for the data transmission is may be determined based on a decoding content of a scheduling assignment that is received from a transmitting UE and which indicates a number or a set of subchannels within the ALLOCATED BANDWIDTH. The TRANSMISSION BANDWIDTH associated with the ALLOCATED BANDWIDTH may be determined to correspond to a largest number of resource blocks for an allowed DFT size and such that the allocated bandwidth is greater or equal to the TRANSMISSION BANDWIDTH.

Example Modules

Figure 8:
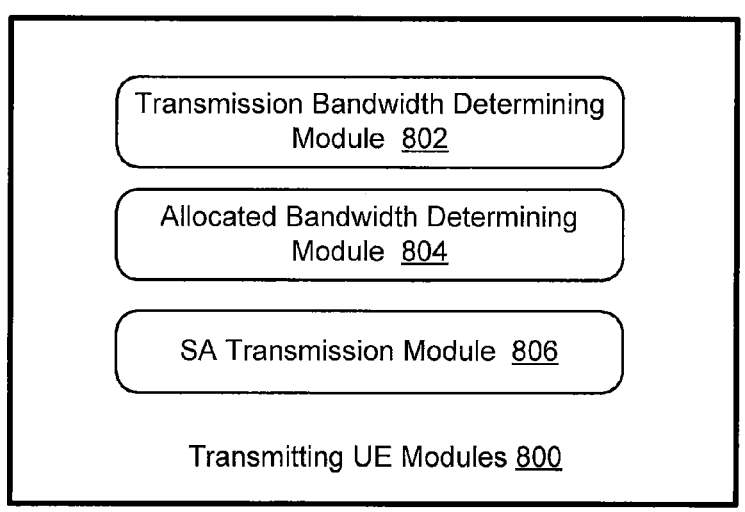
FIG. 8 is a block diagram of modules for a transmitting UE that perform operations and methods disclosed herein according to some embodiments.

FIG. 8 illustrates modules 800 for a transmitting UE (Tx) that perform operations and methods disclosed herein according to some embodiments. The modules 800 include a transmission bandwidth determining module 802, an allocated bandwidth determining module 804, and a SA transmission module 806. The transmission bandwidth determining module 802 is for performing the operations and methods described above for block 400 of FIG. 4 and/or block 502 of FIG. 5. The allocated bandwidth determining module 804 is for performing the operations and methods described above for block 402 of FIG. 4 and/or block 500 of FIG. 5. The SA transmission module 806 is for performing the operations and methods described above for block 404 of FIG. 4 and/or block 504 of FIG. 5.

Figure 9:
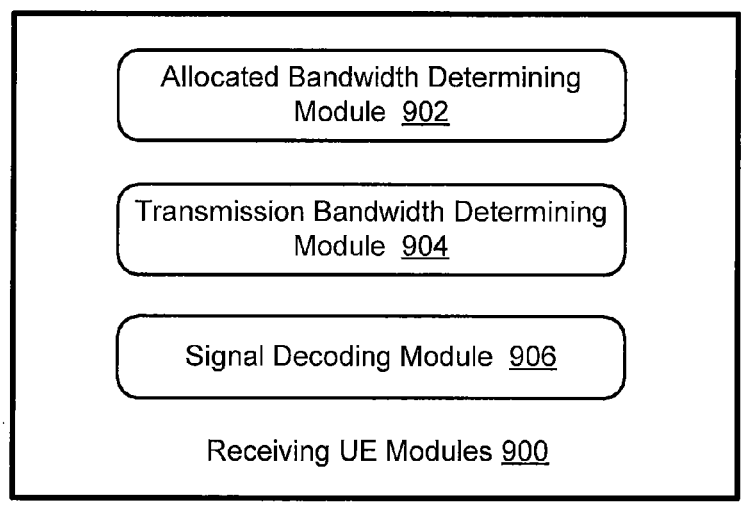
FIG. 9 is a block diagram of modules for a receiving UE that perform operations and methods disclosed herein according to some embodiments.

FIG. 9 illustrates modules 900 for a receiving UE (Rx) that perform operations and methods disclosed herein according to some embodiments. The modules 900 include an allocated bandwidth determining module 902, a transmission bandwidth determining module 904, and a signal decoding module 906. The allocated bandwidth determining module 902 is for performing the operations and methods described above for block 600 of FIG. 6. The transmission bandwidth determining module 904 is for performing the operations and methods described above for block 602 of FIG. 6. The signal decoding module 906 is for performing the operations and methods described above for block 604 of FIG. 6.

Abbreviations and Explanations

3G Third Generation of Mobile Telecommunications Technology
BSM Basic Safety Message
BW Bandwidth
CAM Cooperative Awareness Message
D2D Device-to-Device Communication
DENM Decentralized Environmental Notification Message
DL Downlink
DSRC Dedicated Short-Range Communications
DFT Discrete Fourier Transform
eNB eNodeB
ETSI European Telecommunications Standards Institute
FDMA Frequency-Division Multiple Access
LTE Long-Term Evolution
NW Network
SAE Society of the Automotive Engineers
TDMA Time-Division Multiple Access
TF Transport Format
UE User Equipment
UL Uplink
V2I Vehicle-to-Infrastructure
V2P Vehicle-to-Pedestrian
V2V Vehicle-to-vehicle communication
V2X Vehicle-to-anything-you-can-imagine
3GPP Third Generation Partnership Project Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

LISTING OF EMBODIMENTS

Embodiment 1

A method by a transmitting user equipment, UE, (100) for controlling radio resources used for a data transmission, the method comprising:

determining (400, 502) transmission bandwidth for the data transmission;
determining (402, 500) an allocated bandwidth; and
transmitting (404, 504) toward a receiving UE a scheduling assignment that indicates a number or a set of subchannels within the allocated bandwidth.

Embodiment 2

The method of Embodiment 1, wherein:
the determining (400, 502) transmission bandwidth comprises determining (400) the transmission bandwidth based on allowed Discrete Fourier Transform size.

Embodiment 3

The method of any of Embodiments 1 through 2, wherein:
the determining (402, 500) allocated bandwidth comprises determining (402) the allocated bandwidth based on the transmission bandwidth using a defined rule.

Embodiment 4

The method of Embodiment 3, wherein the determining (402) the allocated bandwidth based on the transmission bandwidth using a defined rule, comprises:
determining the allocated bandwidth to correspond to a smallest number of subchannels in the transmission bandwidth, so that the allocated bandwidth is greater than or equal to the transmission bandwidth.

Embodiment 5

The method of Embodiment 1, wherein:
the determining (402, 500) an allocated bandwidth is performed before the determining (400, 502) transmission bandwidth for a data transmission;
the determining (402, 500) allocated bandwidth comprises determining (500) the allocated bandwidth responsive to signals received from a network node (110); and
the determining (400, 502) transmission bandwidth comprises determining (502) the transmission bandwidth as a largest number of resource blocks for a Discrete Fourier Transform size allowed for the UE (100) and such that the allocated bandwidth is greater or equal to the transmission bandwidth.

Embodiment 6

A user equipment, UE, (100) for controlling radio resources used for a data transmission, the UE (100) configured to perform the method of any of Embodiments 1 through 5.

Embodiment 7

A user equipment, UE, (100) for controlling radio resources used for a data transmission, the UE (100) comprising:
a radio transceiver (720);
at least one processor (700); and
at least one memory (710) coupled to the at least one processor (700) and the radio transceiver (720), and storing program code (712) that when executed by the at least one processor (700) causes the at least one processor (700) to perform operations comprising:

determining (400, 502) transmission bandwidth for the data transmission;
determining (402, 500) an allocated bandwidth; and
transmitting (404, 504) toward a receiving UE a scheduling assignment that indicates a number or a set of subchannels within the allocated bandwidth.

Embodiment 8

The UE (100) of Embodiment 7, wherein:
the determining (400, 502) transmission bandwidth comprises determining (400) the transmission bandwidth based on allowed Discrete Fourier Transform size.

Embodiment 9

The UE (100) of any of Embodiments 7 through 8, wherein:
the determining (402, 500) allocated bandwidth comprises determining (402) the allocated bandwidth based on the transmission bandwidth using a defined rule.

Embodiment 10

The UE (100) of Embodiment 9, wherein the determining (402) the allocated bandwidth based on the transmission bandwidth using a defined rule, comprises:
determining the allocated bandwidth to correspond to a smallest number of subchannels in the transmission bandwidth, so that the allocated bandwidth is greater than or equal to the transmission bandwidth.

Embodiment 11

The UE (100) of Embodiment 7, wherein:
the determining (402, 500) an allocated bandwidth is performed before the determining (400, 502) transmission bandwidth for a data transmission;
the determining (402, 500) allocated bandwidth comprises determining (500) the allocated bandwidth responsive to signals received from a network node (110); and
the determining (400, 502) transmission bandwidth comprises determining (502) the transmission bandwidth as a largest number of resource blocks for a Discrete Fourier Transform size allowed for the UE (100) and such that the allocated bandwidth is greater or equal to the transmission bandwidth.

Embodiment 12

A method by a receiving user equipment, UE, (100) for receiving a data transmission using radio resources, the method comprising:
determining (600) allocated bandwidth for a data transmission based on control signaling that is received by the receiving UE (100);
determining (602) transmission bandwidth associated with the allocated bandwidth based on a rule that is used by a transmitting UE, which will perform the data transmission, to determine the allocated bandwidth based on the transmission bandwidth; and
decoding (604) a signal based on the parameters of the transmission bandwidth.

Embodiment 13

The method of Embodiment 12, wherein the allocated bandwidth for the data transmission is determined (600) based on a decoding content of a scheduling assignment that is received from a transmitting UE and which indicates a number or a set of subchannels within the allocated bandwidth.

Embodiment 14

The method of any of Embodiments 12 through 13, wherein the transmission bandwidth associated with the allocated bandwidth is determined (602) to correspond to a largest number of resource blocks for an allowed DFT size and such that the allocated bandwidth is greater or equal to the transmission bandwidth.

Embodiment 15

The method of any of Embodiments 12 through 14, wherein the decoding (604) uses the transmission bandwidth to constrain what radio frequency resources are searched for the signal that is to be decoded.

Embodiment 16

A user equipment, UE, (100) for receiving a data transmission using radio resources, the UE (100) configured to perform the method of any of Embodiments 12 through 15.

Embodiment 17

A user equipment, UE, (100) for receiving a data transmission using radio resources, the UE (100) comprising:
a radio transceiver (720);
at least one processor (700); and
at least one memory (710) coupled to the at least one processor (700) and the radio transceiver (720), and storing program code (712) that when executed by the at least one processor (700) causes the at least one processor (700) to perform operations comprising:
determining (600) allocated bandwidth for a data transmission based on control signaling that is received by the receiving UE (100);
determining (602) transmission bandwidth associated with the allocated bandwidth based on a rule that is used by a transmitting UE, which will perform the data transmission, to determine the allocated bandwidth based on the transmission bandwidth; and
decoding (604) a signal from the data transmission based on parameters of the transmission bandwidth.

Embodiment 18

The UE (100) of Embodiment 17, wherein the allocated bandwidth for the data transmission is determined (600) based on a decoding content of a scheduling assignment that is received from a transmitting UE and which indicates a number or a set of subchannels within the allocated bandwidth.

Embodiment 19

The UE (100) of any of Embodiments 17 through 18, wherein the transmission bandwidth associated with the allocated bandwidth is determined (602) to correspond to a largest number of resource blocks for an allowed DFT size and such that the allocated bandwidth is greater or equal to the transmission bandwidth.

Embodiment 20

The UE (100) any of Embodiments 17 through 19, wherein the decoding (604) uses the transmission bandwidth to constrain what radio frequency resources are searched for the signal that is to be decoded.

The invention claimed is:

1. A method by a transmitting user equipment, UE, for controlling radio resources used for a data transmission, the method comprising:
   determining a transmission bandwidth for the data transmission;
   determining an allocated bandwidth; and
   transmitting toward a receiving UE a scheduling assignment that indicates a number of subchannels within the allocated bandwidth or a set of subchannels within the allocated bandwidth;
   wherein determining the transmission bandwidth comprises determining a largest number of resource blocks for a supported Discrete Fourier Transform (DFT) size such that the allocated bandwidth is greater than or equal to the transmission bandwidth.

2. The method of claim 1, wherein:
   supported DFT sizes are products of powers of 2,3,5.

3. A user equipment, UE, for controlling radio resources used for a data transmission, the UE comprising:
   at least one processor; and
   at least one memory coupled to the at least one processor, and storing program code that when executed by the at least one processor causes the at least one processor to perform operations comprising:
      determining a transmission bandwidth for the data transmission;
      determining an allocated bandwidth; and
      transmitting toward a receiving UE a scheduling assignment that indicates a number of subchannels within the allocated bandwidth or a set of subchannels within the allocated bandwidth;
   wherein determining the transmission bandwidth comprises determining a largest number of resource block for a supported Discrete Fourier Transform (DFT) size such that that the allocated bandwidth is greater than or equal to the transmission bandwidth.

4. The UE of claim 3, wherein:
   supported DFT sizes are products of powers 2,3,5.

5. A method by a receiving user equipment, UE, for receiving a data transmission using radio resources, the method comprising:
   determining an allocated bandwidth for a data transmission based on control signaling that is received by the receiving UE;
   determining a transmission bandwidth associated with the allocated bandwidth; and
   decoding a signal based on the transmission bandwidth, wherein determining the transmission bandwidth comprises determining a largest number of resource blocks for a supported Discrete Fourier Transform size such that the allocated bandwidth is greater than or equal to the transmission bandwidth.

6. The method of claim 5, wherein the allocated bandwidth for the data transmission is determined based on a decoding content of a scheduling assignment that is received from a transmitting UE and which indicates a number or a set of subchannels within the allocated bandwidth.

7. The method of claim 5, wherein the decoding uses the transmission bandwidth to constrain what radio frequency resources are searched for the signal that is to be decoded.

8. A user equipment, UE, for receiving a data transmission using radio resources, the UE comprising:
   at least one processor; and
   at least one memory coupled to the at least one processor, and storing program code that when executed by the at least one processor causes the at least one processor to perform operations comprising:
      determining an allocated bandwidth for a data transmission based on control signaling that is received by the receiving UE;
      determining a transmission bandwidth associated with the allocated bandwidth; and
      decoding a signal from the data transmission based on the transmission bandwidth,
   wherein determining the transmission bandwidth comprises determining a largest number of resource blocks for a supported Discrete Fourier Transform size such that the allocated bandwidth is greater than or equal to the transmission bandwidth.

9. The UE of claim 8, wherein the allocated bandwidth for the data transmission is determined based on a decoding content of a scheduling assignment that is received from a transmitting UE and which indicates a number or a set of subchannels within the allocated bandwidth.

10. The UE of claim 8, wherein the decoding uses the transmission bandwidth to constrain what radio frequency resources are searched for the signal that is to be decoded.

11. A computer program product comprising:
   a non-transitory computer readable medium storing program code executable by at least one processor of a user equipment (UE) to control radio resources used for a data transmission by the UE, wherein the program code is configured for execution by the at least one processor to cause the UE to perform the method according to claim 1.

12. A computer program product comprising:
   a non-transitory computer readable medium storing program code executable by at least one processor of a user equipment (UE) for receiving a data transmission using radio resources, wherein the program code is configured for execution by the at least one processor to cause the UE to perform the method according to claim 5.

13. The method of claim 1, wherein
   determining the allocated bandwidth comprises receiving the allocated bandwidth from a network node signaling the allocated bandwidth to the transmitting UE.

14. The method of claim 1, wherein:
   determining the allocated bandwidth comprises determining the allocated bandwidth before determining the transmission bandwidth.

15. The UE of claim 3, wherein
   determining the allocated bandwidth comprises receiving the allocated bandwidth from a network node signaling the allocated bandwidth to the transmitting UE.

16. The UE of claim 3, wherein:
   determining the allocated bandwidth is performed before determining the transmission bandwidth.

17. The method of claim 5, wherein determining the transmission bandwidth associated with the allocated bandwidth is based on a rule that is used by a transmitting UE.

18. The method of claim 5, wherein determining the allocated bandwidth comprises determining the allocated bandwidth before determining the transmission bandwidth.

19. The UE of claim 8, wherein determining the transmission bandwidth associated with the allocated bandwidth is based on a rule that is used by a transmitting UE.

20. The UE of claim 8, wherein determining the allocated bandwidth comprises determining the allocated bandwidth before determining the transmission bandwidth.

\* \* \* \* \*

UNITED STATES PATENT AND TRADEMARK OFFICE
CERTIFICATE OF CORRECTION

PATENT NO. : 10,841,064 B2
APPLICATION NO. : 16/324993
DATED : November 17, 2020
INVENTOR(S) : Sorrentino et al.

It is certified that error appears in the above-identified patent and that said Letters Patent is hereby corrected as shown below:

On the Title Page

Item (73), under "Assignee", in Column 1, Lines 1-2, delete "TELEFONAKTIEBOLAGET ERICSSON (publ)," and insert -- TELEFONAKTIEBOLAGET LM ERICSSON (publ), --, therefor.

In the Specification

In Column 3, Line 27, delete "in that" and insert -- is that --, therefor.

In Column 5, Line 17, delete "disclosure all" and insert -- disclosure of all --, therefor.

In Column 5, Line 22, delete "disclosure all" and insert -- disclosure of all --, therefor.

In Column 11, Lines 12-13, delete "(DVD/BlueRay)." and insert -- (DVD/Blu-Ray). --, therefor.

In the Claims

In Column 15, Line 42, in Claim 3, delete "that that" and insert -- that --, therefor.

In Column 15, Line 45, in Claim 4, delete "powers 2,3,5." and insert -- powers of 2,3,5. --, therefor.

In Column 16, Line 10, in Claim 8, delete "the receiving UE;" and insert -- the UE; --, therefor.

In Column 16, Line 44, in Claim 13, delete "wherein" and insert -- wherein: --, therefor.

In Column 16, Line 52, in Claim 15, delete "wherein" and insert -- wherein: --, therefor.

In Column 16, Line 55, in Claim 15, delete "the transmitting UE." and insert -- the UE. --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*